United States Patent

[11] 3,578,241

| [72] | Inventors | Philip J. Wombough<br>4255 Ocean Blvd.;<br>Charles E. Tallerino, 3717 Yosemite,<br>Pacific Beach, Calif. 92109 |
|---|---|---|
| [21] | Appl. No. | 866,806 |
| [22] | Filed | Oct. 16, 1969 |
| [45] | Patented | May 11, 1971 |

[54] SLIDE RULE FOR SCUBA DIVERS
11 Claims, 6 Drawing Figs.

| [52] | U.S. Cl. | 235/88 |
|---|---|---|
| [51] | Int. Cl. | G06c 3/00 |
| [50] | Field of Search | 235/78, 88, 70, 70.1 |

[56] References Cited
UNITED STATES PATENTS

| 3,058,653 | 10/1962 | Des Granges | 235/88 |
|---|---|---|---|
| 3,111,003 | 11/1963 | Droz | 235/88X |
| 3,434,658 | 3/1969 | Goldstein | 235/88X |

*Primary Examiner*—Richard B. Wilkinson
*Assistant Examiner*—Stanley A. Wal
*Attorney*—Victor C. Muller ABSTRACT: A circular slide rule for use by scuba divers which coordinates the variables of air tank pressure, depth of submergence, breathing rate, and time and with which a variable may be determined when the others are known. The time available at depth is disposed on a scale formed as two separate parts, the first being from surface to an intermediate depth and the other from the intermediate depth to maximum depth which provides greater accuracy at greater depths, where it is most needed. The discs of the slide rule are flexible and of various diameters permitting the selective locking together of different combinations of same by the fingers of the user.

Patented May 11, 1971

INVENTORS
PHILIP J. WOMBOUGH
CHARLES E. TALLERINO

BY VICTOR C. MULLER
ATTORNEY

Patented May 11, 1971

SLIDE RULE FOR SCUBA DIVERS

BACKGROUND OF THE INVENTION

As is well known in the diving art, the total time that a diver may stay submerged with a supply of air under pressure is dependent upon several factors which include the rate of descent and ascent, the time spent at one or more depths, the air consumption or breathing rate under normal and abnormal rates of swim or other exertion, water temperature, and decompression time if the dive has been one which requires decompression before surfacing. Theoretically, the submerged time for the diver can be mathematically computed if the variables are known before the dive and the dive is executed strictly in accordance with a plan which takes into consideration the variables referred to. With the exception of an intended repetitive identical dive, the diver does not have the required information available to accurately determine his submerged total time, or time at a particular depth, and hence lengthy and complicated calculation, while submerged, provides no solution to his problems which may require a solution within an extremely small time, which may be as little as a fraction of a minute. This is particularly true of a first and exploratory dive where the diver does not know in advance some of the more important variables, such as the depth or various depths of the dive and the time to be spent at same. Heretofore it has been the practice for a diver to carry with him a watch, usually with a rotatable bezel, for determining elapsed time, and particularly if the dive is to be of substantial duration. Also, he usually carries a depth gauge with him for the purpose of determining his position below the surface and also for coordinating the change of depth position with his watch to maintain rate of descent or ascent within desired limits. If this is the only instrumentation carried with him, it becomes apparent that he has no accurate way of determining the quantity of air remaining in the air tank or tanks. In some instances, but not in the majority, a tank pressure gauge may be carried which is some indication of his remaining air supply and may serve to indicate when a situation of danger arises. Also, a so-called J-valve may be employed which can be opened when tank pressure decreases to a danger point, for example at about 300 p.s.i. This, however is only an emergency device to valve to the reserve remaining pressure and is normally used only when he can no longer obtain air through the normal valving and pressure-reducing system. Upon operation of the J-valve, immediate ascent is thus mandatory. It thus becomes apparent that if the diver could carry with him a calculating device with which he could quickly and accurately determine his situation with respect to variables which are unknown in advance he could execute a dive with considerably more safety than was formerly possible. As will subsequently appear in detail, the present invention provides a calculating device for such general purpose and with which problems of danger may be calculated before they arise, rather than attempting to remedy a situation of danger after it has arisen.

SUMMARY OF THE INVENTION

A time-depth computer in the form of a slide rule which may be carried by a diver which coordinates the variables of air tank pressure, depth of submergence, breathing rate, and time which solves for one of the variables if the other three are known. It includes a chart, sometimes employed in a calculation, for determining descent consumption time and another chart for determining time permissible at various depths where no decompression is required. An exemplary construction is in the form of four superimposed discs, pivotally connected for relative rotation about a central axis. Windows are provided in certain of the members which permit reading of only a limited portion of certain of the scales to thereby obviate a miscalculation. The discs are so related that they may all be individually moved or certain of the discs secured against relative rotation by the finger tips, permitting only one disc to move while the others are locked together. The discs are waterproof, may readily be spread apart for cleaning foreign matter which may become lodged therebetween, and the finish of the surface is such that data may be marked with a grease pencil while submerged in the water.

A principal object of the invention is, accordingly, the provision of a slide rule which coordinates the variables of air tank pressure, depth of submergence, breathing rate, and time.

Another object is the provision of the solution for one of the variables when the others are known.

Another object is the provision of a construction for obscuring all portions of certain of its scales, except for a desired scale setting, to thereby obviate possibility of a miscalculation.

Another object is the provision of an arrangement of four superimposed relatively rotatable discs, certain of which, such as two or three, may be locked together by the fingers of an operator, permitting one or two of the others to be rotated to desired position.

Another object is the provision of flexible discs which may readily be separated laterally to flush away foreign matter which may become lodged between the discs.

A further object is the provision of discs having surface finishes upon which removable grease pencil marking may be applied while submerged in water.

Still further objects, advantages and salient features will become more apparent from the description to follow, the appended claims, and the accompanying drawing, to now be briefly described.

DESCRIPTION OF THE PREFERRED EMBODIMENT

Figure 1:
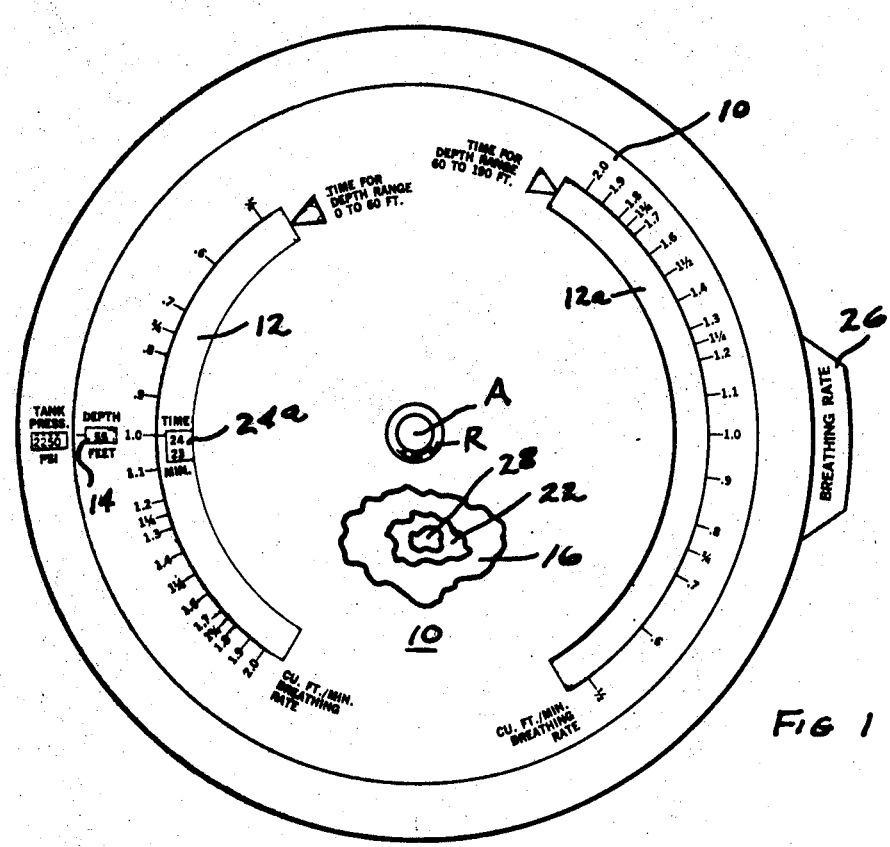
FIG. 1 is a plan view of four superimposed discs in one position of parts, portions being broken away.
Figure 1A:
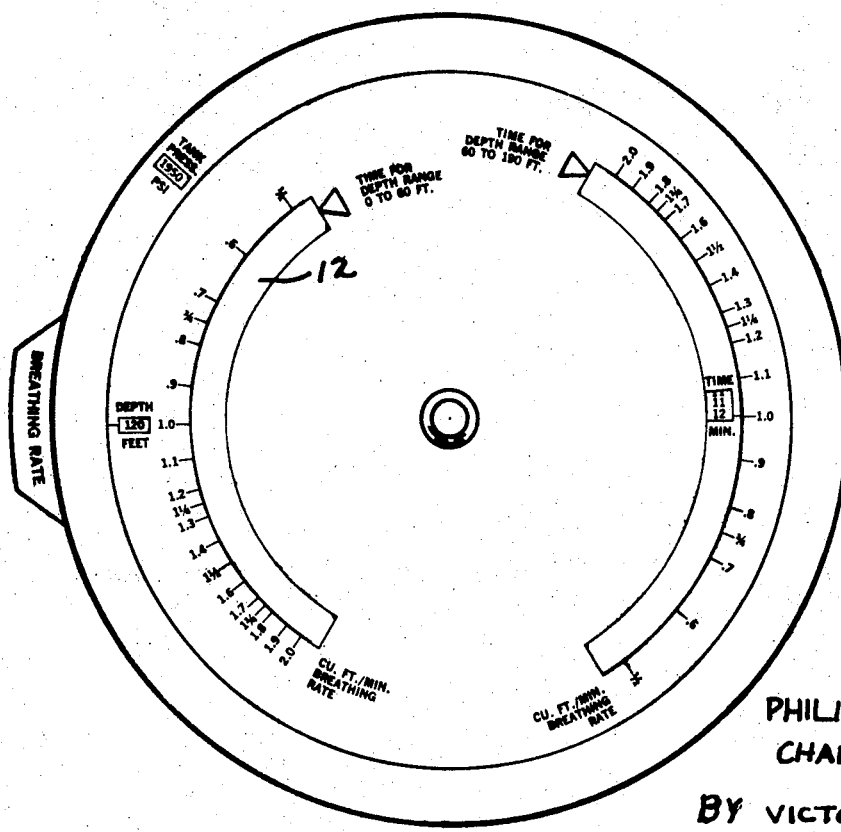
FIG. 1A is a like view in another position of parts.

Referring now to the drawing, FIG. 1 is a top plan view of four superimposed discs secured together at their centers by a hollow rivet R or the like, which forms a central pivotal axis A about which all discs are relatively rotatable. FIG. 1A is the same as FIG. 1 except that the discs have been relatively rotated to employ a different portion of a time for depth range scale. The top disc 10, which is not further illustrated in the remaining FIGS. is provided with two arcuate windows 12,12a, designated "time for depth range" 0 to 60 feet and 60 to 190 feet, respectively, and arcuate "breathing rate" scales adjacent each of same. It is further provided with a box window 14 designated "depth-feet."

Figure 2:
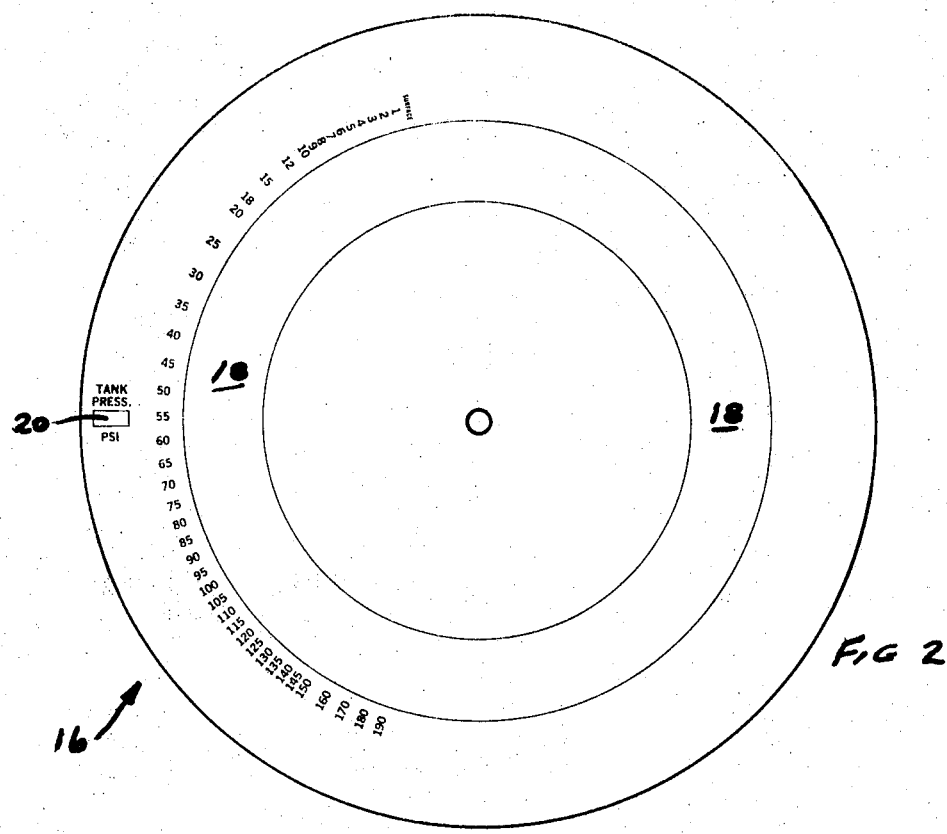
FIG. 2 is a plan view of the second disc.

Referring now to FIG. 2, the second disc 16, disposed next below disc 10 is provided with a circular window 18 and an adjacent arcuate scale graduated in depth between "surface" (or 0) and 190 ft. It is further provided with a window 20 designated "tank pressure—p.s.i."

Figure 3:
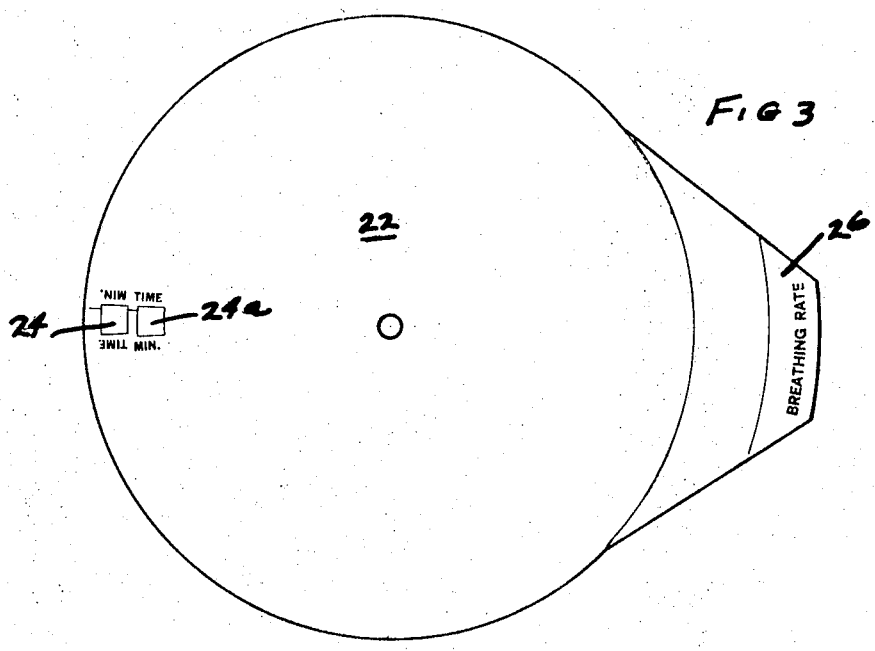
FIG. 3 is a plan view of the third disc.

Referring now to FIG. 3, the third disc 22, disposed beneath disc 16, is provided with two adjacent windows 24,24a designated "time-min." (time in minutes). It is further provided with a lateral tab 26 designated as "breathing rate."

Figure 4:
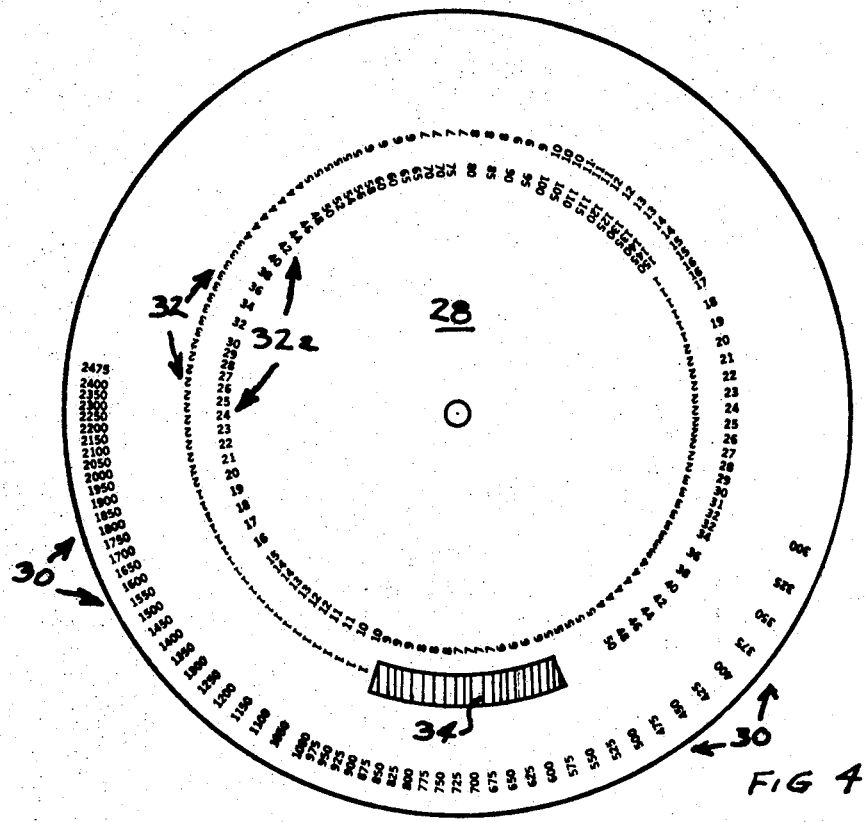
FIG. 4 is a plan view of the fourth and bottom disc.

Referring now to FIG. 4, the top or obverse face of bottom disc 28 is provided with an outer circular scale 30 graduated between 300 and 2,475 (air tank pressure in p.s.i.) and a pair of concentric scales, 32;32a the outer one being graduated between 1 and 50 and the other between 1 and 150. A red arcuate area 34 is disposed adjacent one end of scale 32 which indicates less than 1 minute. (This appears black at depth.)

Figure 5:
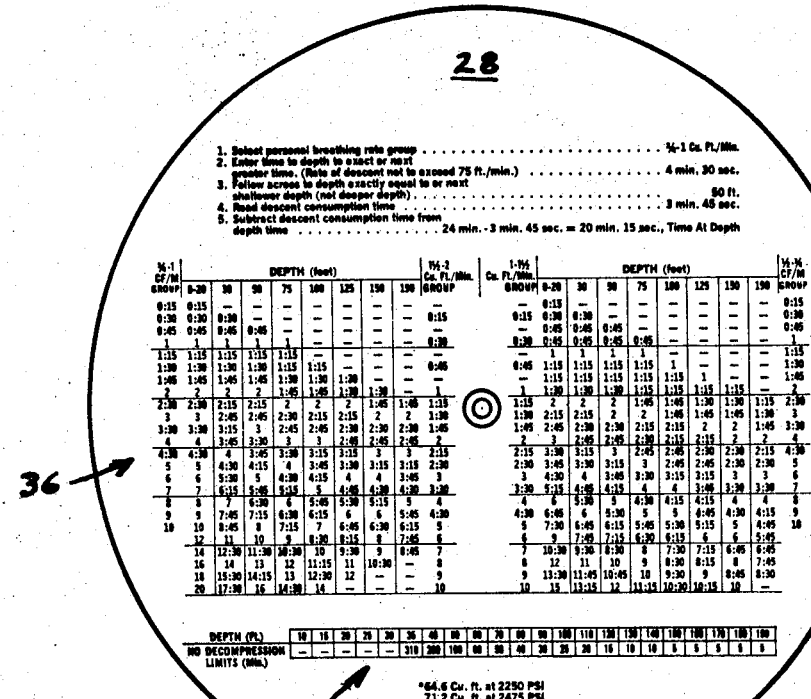
FIG. 5 is a plan view of the reverse or bottom face of the fourth disc.

Referring now to FIG. 5, the reverse face of bottom disc 28 is provided with an upper chart 36, formed in two parts, and a lower chart 38 disposed below same, the purposes of which will subsequently be described.

The discs so far described were photographically reproduced to actual size on the original drawing and if reproduced with the windows as cutouts in the patent drawing, the parts of the patent drawing could be assembled to produce the arrangements of FIGS. 1 or 1A, except that they would be to slightly reduced scale, which of course, would not change their cooperative relationship.

Before proceeding with further detailed description of various modes of operation, the general manner in which the various scales and windows cooperate will now be described to better understand their structural relationships.

EXAMPLE 1 (ILLUSTRATED)

Again referring to FIG. 1, let it be assumed that the diver is at a known depth of 55 feet and tank pressure is known to be 2,250 p.s.i. The discs are rotated so that these values are viewed through the windows, as shown, and the top disc 10, second disc 16 and bottom disc 28 are squeezed between the finger tips, locking them together. Tab 26 on the third disc 22 is then rotated until its window registers with a breathing rate of 1.0 cu. ft./min. which it will be further assumed is the known breathing rate of the diver. At this setting, 24 appears through arcuate window 12 and box window 24a, indicating that the diver may remain at 55 feet for 24 minutes before starting his ascent to the surface. This time is based on a single 72 cu. ft. tank. If double tanks are employed, the time is doubled. In the simplified example just set forth it was assumed that there was a tank pressure of 2,250 p.s.i. when the diver was at 55 ft. This could be determined by a tank pressure or "sea-vue" gauge if the diver is provided with same. Let it now be assumed that the diver is not provided with such gauge but starts the descent with a full tank known to have 2,250 p.s.i. The diver must now correct the 24 minute calculation by subtracting the descent consumption time. Referring to chart 36, FIG. 5, which is "descent consumption time" and assuming that the diver intends to dive to 55 ft. in 4 min. 30 sec., it will be noted that in the ¾—1 cf./m group at 4 min. 30 sec. and the 50-ft. column, descent consumption time is 3 min. 45 sec. Actual time available at 55 ft. is thus the 24-min. calculated less 3 min. 45 sec. or 20 min. 15 sec. This example is also set forth above chart 36.

Chart 38, previously referred to, is a "no decompression table" and indicates the safe time at which the diver may remain at various depths without decompression. As indicated below the table, rate of ascent is assumed to be 60 ft./min. (e.g. not to exceed 60 ft./min.). This rate may readily be determined by a diver without calculation since small air bubbles ascend to the surface at approximately this rate. Thus, when the bubbles appear stationary with respect to the diver he is ascending at their rate.

EXAMPLE 2 (NOT ILLUSTRATED)

As will be apparent from the description so far set forth, the breathing rate of the diver must be known, which varies with individuals and with the extent of physical exertion of each. This can be determined only experimentally. An initial determination may be made before a dive by walking briskly on the surface and noting the time required to deplete a tank by say 300 p.s.i. If this required, say 8 min., the tank pressure would be set at 300 p.s.i., the depth at "surface" (or 0) and the breathing rate tab moved to 8 min. It would then register with a breathing rate of 1 cu. ft./min.

Another method is to determine initial tank pressure at predetermined depth and remain thereat with a normal swim until no air is delivered from the tank. For example, if initial tank pressure is set at 2,150 p.s.i., depth set at 75 ft. and time set to 25 min., the time window would register with a breathing rate of three-fourths cu. ft./min. Ascent of course, is immediately mandatory unless a reserve supply of air is available through a J-valve, in which event ascent should, nevertheless, be commenced.

A further method for determining breathing rate and time remaining at depth may be employed when the diver is provided with a sea-vue gauge and J-valve. Let it be assumed that the gauge reads 2,200 p.s.i. at 80 ft. and the J-valve is pulled after 18 minutes. Assuming that the J-valve rating is 300 p.s.i., this should be subtracted from 2,200 p.s.i. With the various discs now set to register 1,900 p.s.i. and 80 ft., the breathing rate is shown to be between 0.8 and 0.9 cu. ft./min. If the tank pressure is now set at 300 p.s.i. (depth the same-80 ft.) and the time window disposed adjacent 0.9 cu. ft./min. the remaining time is found to be 2 minutes. In another manner of performing this calculation tank pressure may be set at 2,200 p.s.i., depth 80 ft. and breathing rate at 0.9 cu. ft./min. (which has already been determined). The total time available will now read 20 minutes. Subtracting the 18 minutes already used at the depth again yields 2 minutes remaining time.

EXAMPLE 3 (NOT ILLUSTRATED)

Breathing rate may also change during a dive dependent upon swim rate. This can normally be mentally calculated if normal breathing rate is known. If the swim is lighter than normal, breathing rate is about two-thirds normal. If it is heavier than normal the breathing rate is about four-thirds normal, and if it is severe it may be double of normal. This estimation may be employed with the slide rule, an example of which follows: It will be assumed that initial tank pressure is 2,100 p.s.i., depth is 40 ft., breathing rate is three-fourths cu. ft./min. and after 26 min. at that depth breathing rate is doubled. The slide rule settings show that 36 min. were available, and, since 26 min. have elapsed before doubling breathing rate 10 min. remain. With the discs disposed at the foregoing settings the top three discs are secured together with the fingertips and rotated relative to the bottom disc and time of 10 min. is observed. The top, second and bottom discs are then locked together with the fingertips and the breathing rate tab moved until its window registers with the new breathing rate of 1½ cu. ft./min., yielding an answer of 5 min. remaining time with the doubled breathing rate. This time, of course, could have been readily determined mentally since the breathing rate was doubled with 10 min. remaining hence allowing 5 min. remaining time. If it were other than an integral ratio, however, it becomes apparent that a mental calculation would be somewhat difficult.

EXAMPLE 4 (NOT ILLUSTRATED)

When the diver is not provided with a sea-vue gauge he may, under some circumstances, desire to know his tank pressure after having consumed a portion of available air during a previous dive. Referring to Example 1, let it again be assumed that the diver starts a first dive with a full tank of 2,250 p.s.i. and dives to 55 ft., and as calculated, had 20 min. 15 sec. available at such depth. Let it now be assumed that the diver remains at 55 ft. for only 10 min. 15 sec. and returns to the surface and desires to know the tank pressure after returning thereto. He then has 10 min. unused time at 55. Now setting depth at 55 ft. and time at 10 min. it will be found that the calculated tank pressure is 1,000 p.s.i. If he now returns to the surface and ascent time is assumed to be 60 ft./min. he will consume 1 min. of the remaining time during ascent. Upon arriving at the surface the remaining available time is thus 9 min. Now locking the top three discs together and rotating same relative to the bottom disc until 9 min. is observed in the time window, tank pressure will now read between 850 and 925 p.s.i., which is the pressure remaining at the surface and which may be utilized for a subsequent dive.

The foregoing examples also illustrate that in the various uses of the invention various combinations of discs may be locked together and a remaining disc or discs rotated relative to the locked discs. This is rendered possible due to the thinness and lateral flexibility of the discs and their relative diameters. Thus, the second disc 16 and fourth or bottom disc 28 are the same diameter, the first or top disc 10 is somewhat smaller and the third tab disc 22 is the smallest. The second and fourth discs may thus be locked together, the first, second, and fourth discs may be locked together and, by inserting an index finger beneath the second disc, it may be locked to the first disc, the unlocked disc or discs in each case being free to rotate relative to the locked discs.

The slide rule may be carried by the diver in a suitable case (not shown), having a pocket, open at one end, into which it may be inserted or removed, the case preferably having a plurality of slits in one wall of same for securing it to a belt or the like, carried by the diver. Also, it may be additionally secured to the diver by a flexible line or lanyard connected through the hollow central rivet R or an aperture in tab 26. It is preferably formed of superimposed relatively rotatable discs, as illustrated, for economy of manufacture and minimization of spatial requirements but it is to be understood that it may also be constructed as linearly relatively slidable members or concentric relatively rotatable cylindrical members, the three forms referred to being conventional in the slide rule art.

Further instructions for the use of the present invention form a part of this description (an actual slide rule is also attached) which may be formally added in due course if necessary, or cancelled if unnecessary, this being in the interests of possible further aid in the examination and to obviate introduction of possible new matter.

Obviously many modifications and variations of the present invention are possible in the light of the above teachings. It is therefore to be understood that within the scope of the appended claims the invention may be practiced otherwise than as specifically described.

We claim:

1. A slide rule for determining the time available at depth when an original air tank pressure is known in a tank of predetermined volume, the breathing rate of a diver is known, and the descent consumption time is known and with normal rate of ascent which requires no delay for decompression, the slide rule comprising four members disposed in superimposed relationship which are all relatively movable in fixed paths, such as angularly about a common axis, comprising;
    a. a bottom member having an elongated tank pressure scale graduated from a minimum, such as 300 p.s.i., to a maximum, such as 2,475 p.s.i., and a pair of equidistant spaced elongated time for depth range scales, one being from a minimum to a predetermined intermediate time, such as 1 to 50 min., and the other from minimum to maximum time, such as 1 to 150 min.,
    b. a first intermediate member having finger engageable means, such as a tab, for moving same and having two spaced time windows, through which a time on one of the time for depth range scales may be read and the other through which a time on the other time for depth range scale may be read,
    c. a second intermediate member having a window of a length and width through which said time for depth range scales may be read through one of said spaced windows in the first intermediate member, the second intermediate member having another window through which a tank pressure may be read on the tank pressure scale on the bottom member, and also having an elongated depth scale, graduated from minimum to maximum such as from 0 to 190 feet,
    d. and a top member having a first window through which a depth on the depth range scale may be read, the top member having a pair of elongated time windows through which a time on the time for depth range scales may be read, and a breathing rate scale graduated between limits, such as one-half to 2 cubic feet per minute, disposed adjacent each of the pair of windows, aforesaid, a breathing rate on either adapted to be aligned with one of said spaced time windows in the first intermediate member,
    e. the construction and arrangement being such that, when the tank pressure and depth may be simultaneously read, and the known breathing rate is aligned with the time window, a time at depth may be read, the actual time being such time less the descent consumption time.

2. A slide rule in accordance with claim 1 wherein said members are disc-shaped and relatively rotatable about a common central axis and the scales are disposed arcuately about said axis.

3. A slide rule in accordance with claim 2 wherein the bottom and second intermediate members are substantially the same diameter, said top member being of lesser diameter than the members aforesaid, and the first intermediate member being of a diameter less than the top member.

4. A slide rule in accordance with claim 3 wherein said first intermediate member is superimposed on said bottom member and said second intermediate member is superimposed on said first intermediate member and next adjacent to the top member.

5. A slide rule in accordance with claim 1 wherein said bottom member is provided with indicia for indicating that less than said minimum remains, to thereby warn the diver to immediately commence ascent.

6. A slide rule in accordance with claim 1 wherein at least the two intermediate members and top member, having the windows in same, are constructed of transparent material to form the windows, the remaining portions having an opaque waterproof coating on same to obscure visibility except through the windows.

7. A slide rule in accordance with claim 6 wherein said bottom member has a rear face, exposed at all times irrespective of the relative position of the members, said face having data thereon which may be employed with a calculation made by the slide rule.

8. A slide rule in accordance with claim 7 wherein said data includes a chart of descent consumption time and a chart of time at depth with no decompression during ascent.

9. A slide rule in accordance with claim 1 wherein said first intermediate member is superimposed on said bottom member and said second intermediate member is superimposed on said first intermediate member and next adjacent to the top member.

10. A slide rule in accordance with claim 1 wherein said members are circular and of various diameters to permit various combinations of same to be locked together by fingers of an operator.

11. A slide rule for determining the time available at depth when an original air tank pressure is known in a tank of predetermined volume, the breathing rate of a diver is known, and the descent consumption time is known and with normal rate of ascent which requires no delay for decompression, the slide rule comprising four members disposed in superimposed relationship which are all relatively movable in fixed paths such as angularly about a common axis, comprising;
    a. a bottom member having an elongated tank pressure scale graduated from a minimum to a maximum and an elongated time for depth range scale,
    b. a first intermediate member having finger engageable means for moving same, and a time window through which a time on the time for depth range scale may be read,
    c. a second intermediate member having a window through which said time for depth range scale may be read through the window of the first intermediate member, the second intermediate member having another window through which a tank pressure may be read on the tank pressure scale on the bottom member, and also having an elongated depth scale graduated from minimum to maximum,
    d. and a top member having a first window through which a depth on the depth range scale may be read, the top member having an elongated window through which a time on the time for depth range scale may be read, and a breathing rate scale graduated between limits, disposed adjacent the elongated window, aforesaid, a breathing rate adapted to be aligned with the time window.